United States Patent [19]

Ohtake et al.

[11] Patent Number: 4,866,688
[45] Date of Patent: Sep. 12, 1989

[54] COMPOSITE TRACKING SERVO SYSTEM FOR OPTICAL DISC APPARATUS WITH TRACK OFFSET CORRECTION

[75] Inventors: Masatoshi Ohtake, Ome; Seiji Yonezawa, Hachioji; Toshiaki Tsuyoshi, Kokubunji; Kazuo Ichino, Tokyo; Yukio Fukui, Machida; Takashi Takeuchi, Fujisawa; Takeshi Maeda, Kokubunji; Toshimitsu Kaku, Sagamihara, all of Japan

[73] Assignee: Hitachi, Ltd., Tokyo, Japan

[21] Appl. No.: 942,712

[22] Filed: Dec. 17, 1986

[30] Foreign Application Priority Data

Dec. 20, 1985 [JP] Japan .................................. 60-285508
Jan. 10, 1986 [JP] Japan .................................. 61-2007
Mar. 31, 1986 [JP] Japan .................................. 61-70974

[51] Int. Cl.$^4$ .......................... G11B 7/095; G11B 7/24
[52] U.S. Cl. ........................................ 369/44; 369/46; 369/100; 369/275
[58] Field of Search ...................... 369/44, 46, 100, 54, 369/58, 270; 250/201 DF; 360/77

[56] References Cited

U.S. PATENT DOCUMENTS

| | | | |
|---|---|---|---|
| 4,363,116 | 12/1982 | Kleuters et al. | 369/30 |
| 4,663,751 | 5/1987 | Kaku et al. | 369/46 |
| 4,707,816 | 11/1987 | Yonezawa et al. | 369/44 |
| 4,748,609 | 5/1988 | Yonezawa et al. | 369/44 |

Primary Examiner—Aristotelis M. Psitos
Attorney, Agent, or Firm—Antonelli, Terry & Wands

[57] ABSTRACT

A tracking servo system includes in addition to a composite servo system composed of a push-pull track deviation detecting loop operative with pregrooves formed in an optical disc and a wobbling track deviation detecting loop operative with intermittently provided wobbled tracking marks, an offset correcting loop for detecting offset component possibly produced due to tilt, deformation and eccentricity of a recording medium or change in optical and mechanical parameters in the course of time lapse to drive forcibly a light spot by applying an electrical offset to cancel out the offset component. In the offset correcting loop, light reflected by wobbled tracking marks provided intermittently or mirror areas formed by interrupting intermittently the pregroove is utilized for detecting the offset component.

20 Claims, 14 Drawing Sheets

COMPOSITE TRACKING SERVO SYSTEM FOR OPTICAL DISC APPARATUS WITH TRACK OFFSET CORRECTION

BACKGROUND OF THE INVENTION

The present invention generally relates to a tracking servo system for following up the center of a track with a light spot and an optical disc apparatus in which the tracking servo system is used. More particularly, the invention is concerned with a composite tracking servo system composed compositely of a continuous servo loop in which a differential diffraction method using pregrooves or a so-called push-pull tracking is employed and a sample servo loop in which wobble tracking method using wobbled marks disposed at both sides of a track in a relation wobbled relative to the center of the track, and which system is suitable for application to optical code data memories such as a write-once type optical disc system, an erasable type optical disc system or the like.

As an off-track deviation detecting system adopted widely at present in an optical disc file system, there can be mentioned a so-called push-pull method according to which guide grooves referred to as pregrooves are previously provided on the disc surface, wherein detection of the off-track deviation (hereinafter referred to as the track deviation) is realized by making use of such a phenomenon that upon occurrence of deviation of a light spot focused onto the pregroove from the latter, change will occur in the distribution of the quantity of reflected light due to diffraction of light brought about by the regroove. Although the push-pull system enjoys excellent features preferable for the optical disc file, the system is disadvantageous in respect to high susceptibility to the influence of tilting of the disc, introducing an offset component into the track deviation detecting loop, as the result of which the target or aimed point of the servo system is undesirably shifted, thus making it difficult or even impossible to realize the correct tracking operation. For particulars of the push-pull tracking servo system, reference may be made to, for example, U.S. Pat. No. 4,363,116.

SUMMARY OF THE INVENTION

As an attempt to solve the abovementioned problem of the push-pull tracking system, there has been proposed a composite tracking servo system in which the push-pull method is adopted in combination with another type of the tracking error detecting method. Reference may be made to U.S. Pat. application Ser. No. 845,340 filed Mar. 28, 1986, now U.S. Pat. No. 4,748,609. According to the proposed composite tracking servo system, discontinued or interrupted regions are provided in the pregroove in a number of 10 to 30 for each turn of the track, wherein each of the discontinued regions is provided with at least a pair of wobbled pits on both sides, respectively, with an equal distance from the center line of the track. In operation, when the light spot is deviated or shifted from the track center, the quantity of light reflected from one of the wobbled pits which is provided on one side of the track in the discontinued region of the pregroove will become out of balance with the quantity of light reflected by the counterpart pit provided on the other side. Thus, the track deviation can be detected on the basis of the unbalance or difference between the two reflected light quantities. This detecting method which is referred to as the prewobbling detection method can enjoy advantages in respect to the improved insusceptibility to the influence of the tilting of disc or the like as well as to the occurrence of the offset. In the case of the push-pull detection loop, the track deviation signal can be obtained substantially continuously. In contrast, according to the prewobbling detection method, information concerning the track deviation can be obtained only intermittently. Under the circumstance, a sample and hold circuit is provided for sampling and holding the track deviation information or data which is thus converted to a continuous track deviation signal after having been passed through a low-pass filter and added to the track deviation signal produced by the push-pull error detection loop. In other words, the composite tracking servo system is thus realized.

The composite tracking servo system is very effective for suppressing the offset component produced in the push-pull detection loop and allows requirement for accurate adjustment of the optical system and specification for the tilting of the disc and others to be less severe. However, because both the push pull loop servo system which is operative on the continuous time basis and the wobbling servo loop which is operative on the discrete time basis (i.e. adapted for sampling operation) are combined, the frequency range or band of the offset components to be suppressed is subjected to the influence exerted by the sampling period. Heretofore, no consideration has been paid to this problem. Further, since the track deviation information is obtained only intermittently with the prewobbling technique, the control becomes effective only after the initial tracking operation has proceeded for a certain extent (this phase will be referred to as the tracking lead-in or leading-in operation). In other words, at the time when lead-in operation is started, essentially only the push-pull detection system is effective with the prewobbling detection system remaining inoperative. Consequently, immediately after the lead-in phase, an offset ϵ affects straightforwardly the servo system. The offset can be cancelled out only after the prewobbling error detection loop becomes effective only progressively. The time taken for the prewobbling detection loop to start its function is primarily determined in dependence on the time constant of the low-pass filter. Since the cutoff frequency of this low-pass filter is usually on the order of several ten Hz, the time lapsing before the wobbling detection loop becomes effective must amount to several milli-seconds or more. Under the circumstances, there may arise such situation in which the reproduction and/or recording of data can not be effectuated immediately after the lead-in operation.

It is therefore an object of the present invention to provide a composite tracking servo system which is capable of performing the tracking operation with improved accuracy an high-speed response.

Another object of the present invention is to provide a composite tracking system in which the frequency range of the offset component taking place in the push-pull detection loop and to be suppressed can be increased up to about a half of the sampling frequency employed in the wobbling track error detection without need for broadening the frequency range for the wobbling loop and which can remain stable notwithstanding of variation in gain of the push-pull servo loop.

Still another object of the present invention is to provide an optical disc system in which recording and- /or reproduction of information or data can be accomplished instantaneously by reducing the offset even in a period immediately following the lead-in operation by adopting a composite tracking servo system which includes in combination a continuous track error detection loop operative based on the push-pull principle and an intermittent tracking error detecting loop based on the prewobbling method.

A further object of the present invention is to provide an optical disc system in which an adequate offset suppressing effect as well as rapid response in the seek operation and the like can be assured notwithstanding of the fact that the stable tracking servo system of the composite track wobbling type is adopted for dealing with variation in gain of the push-pull loop.

In view of the above and other objects which will be apparent as description proceeds, there is provided according to an aspect of the present invention a tracking servo system which includes in addition to a composite servo system constituted by a combination of a continuous servo system using the pregrooves and a sample servo system using wobbled tracking marks provided intermittently a feed-forward control loop (offset correcting loop) for detecting the offset components originating in tilting, deformation and/or eccentricity of the optical disc and/or attributable to variations in optical/mechanical parameters occurring in the course of time lapse, for applying an electrical offset to thereby cancel out the offset component by driving forcibly the light spot correspondingly. The feed-forward control loop may be so arranged that the offset component can be detected by making use of the light reflected from the wobbled tracking marks provided intermittently or from mirror surface areas formed intermittently and discontinuously in the pregroove mentioned above.

According to an aspect of the present invention, arrangement may be made such that the feed-forward control loop can exchangeably replace the sample servo loop using the wobbled tracking marks to be combined with the continuous servo loop using the pregrooves. With this arrangement, then the tracking lead-in operation can be effectuated by means of the continuous servo loop which is based on the push-pull detection technique using the pregroove, while the feed-forward control loop on the other hand is coupled to the continuous servo loop in such a manner in which an offset correcting signal for cancelling the offset component can be produced immediately following the tracking lead-in operation on the basis of the detected offset component, to thereby instantaneously position forcibly the light spot at the center of the track. When the offset component detected by the sample servo loop is reduced below a predetermined value, the sample servo loop is combined with the continuous servo loop by changing over the feed-forward servo loop with the sample servo loop to realize the composite tracking servo system.

According to another aspect of the present invention, arrangement may be made such that the feed-forward control loop (offset correcting loop) can be combined with the continuous servo loop together with the sample servo loop. The feed-forward control loop (offset correcting loop) is operative to correct or compensate for offset component in the steady-state produced due to the tilting, deformation and/or eccentricity of the disc or attributable to variations in optical and/or mechanical parameters occurring in the course of time lapse. By virtue of this feature, the wobbling servo loop is get rid of the operation for cancelling the steady-state error, which in turn means that gain as well as the frequency range of the wobbling servo loop can be correspondingly reduced. In this way, tracking operation of a high-speed response can be realized with high accuracy. Further, tracking characteristics can be maintained in the stabilized state even for high-speed offset factors such as successive jumping operations.

BRIEF DESCRIPTION OF THE DRAWINGS

FIGS. 2A to 2D are enlarged fragmental views for illustrating typical wobbled marks provided in an optical disc employed in the system according to the invention, wherein FIGS. 2A and 2D show wobbled marks for use in an inter-groove recording while FIGS. 2B and 2C show the wobbled marks for use in an inter-groove land recording with FIGS. 2C and 2D further showing mirror surface areas provided in a discontinued or interrupted region of a pregroove;

DESCRIPTION OF THE PREFERRED EMBODIMENT

Figure 1:
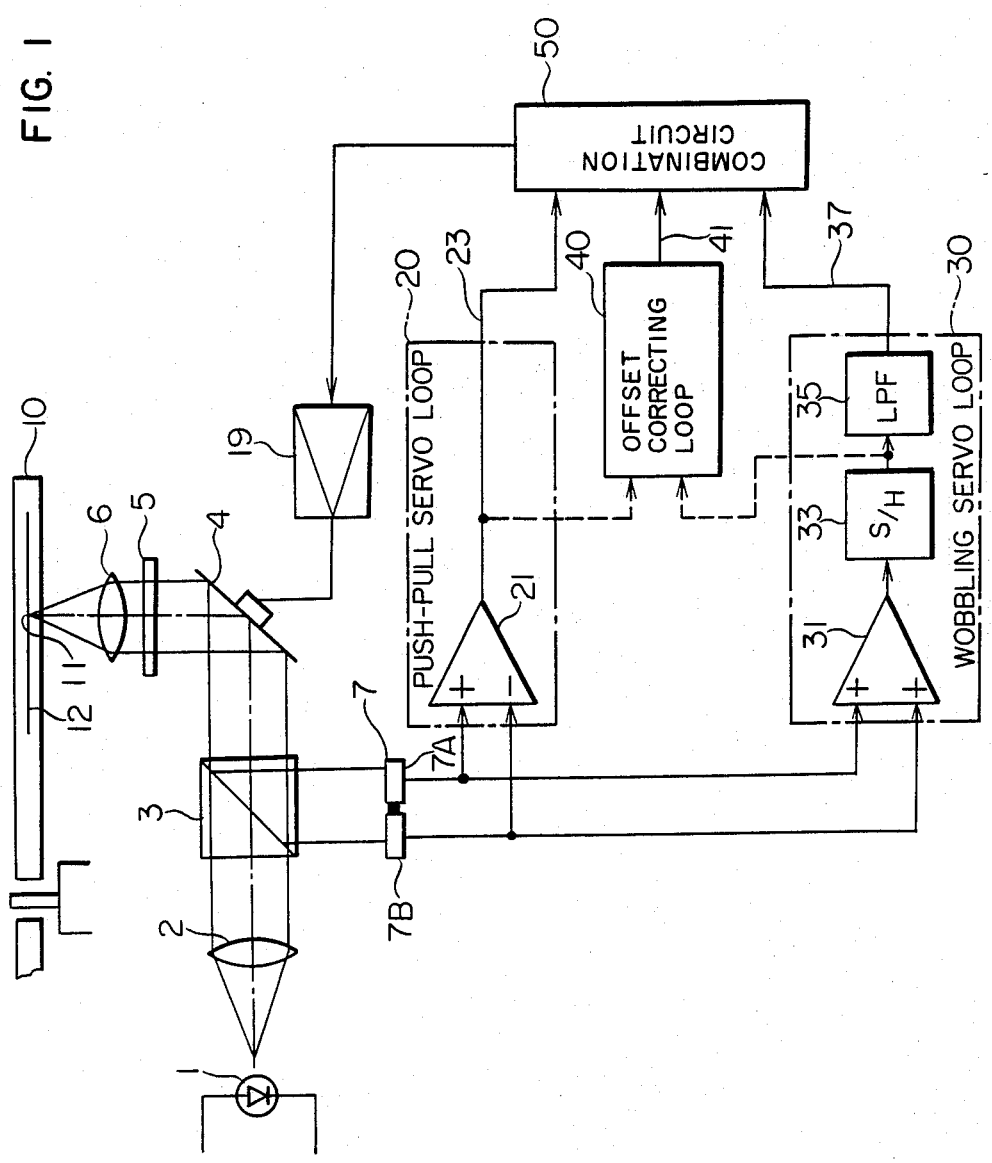
FIG. 1 is a view for illustrating in a block diagram the basic concept underlying the present invention.

FIG. 1 shows a block diagram for illustrating the basic concept underlying the tracking servo system according to the present invention. Referring to the figure, light emitted from a semiconductor laser 1 constituting a light source is collimated by a coupling lens 2, transmitted through a beam splitter 3 and reflected by a galvano-mirror 4 serving as a tracking actuator to be thereby focused onto a recording surface 12 of an optical disc 10 in the form of a light spot 11 by means of an objective lens 6 after having passed a quarter wavelength plate 5. It should however be mentioned that the quarter wavelength plate 5 is not necessarily to be provided. The light reflected at the recording surface is again projected back to the optical system composed of the abovementioned elements to be reflected by the beam splitter 3 and extracted separately from the illuminating light emitted from the light source 1. The reflected light beam is received by a photoelectric detector array 7 (e.g. photoelectric transducer having two splitted-beam receiving photoelectric detectors 7A and 7B) to be converted into electric signals. In the case of this type optical disc apparatus, a focusing control is required for controlling the position of the light spot 11 in the direction coinciding with the optical axis. However, since such control does not constitute any essential part of the invention, description thereof is omitted.

FIGS. 2A to 2D illustrate, by way of example only, typical track structures of the optical disc employed in the system according to the invention. More specifically, FIGS. 2A to 2D are enlarged plan views showing wobbled marks provided previously on the recording surface 12 of the optical disc 10. Referring to the figures, formed previously on the recording surface of the optical disc 10 are pregrooves 15 and 15' each having a plurality of turns in a concentrical circular pattern or spiral pattern. The depth of each pregroove 15, 15' is selected to lie within a range of ⅛ to ¼ of the wavelength of the laser device employed as the light source. The pregroove 15, 15' has discontinued or interrupted regions 120 in a number of 10 to 30 for each turn of the track, wherein each of the discontinued or interrupted regions 120 is provided with at least one pair of wobbled tracking marks 130-1 and 130-2 at both sides of the pregroove, respectively, with an equal distance W from the center line 132 of the pregroove 15. The depth of the wobbled tracking mark may be selected to be equal to ¼ of the laser wavelength, by way of example. In this connection, it should be noted that the pregroove 15, 15' may be divided into a plurality of regions referred to as the sectors, wherein each of the sectors may be separated into a header region where preformatter signals such as a sector mark, track address, sector address and/or synchronizing signal or the like is recorded and a data record region which is destined for use by the user for recording or reproduction of information. In that case, the wobbled tracking marks may also servo simultaneously as the sector marks or for producing synchronizing signal.

Figure 2A:
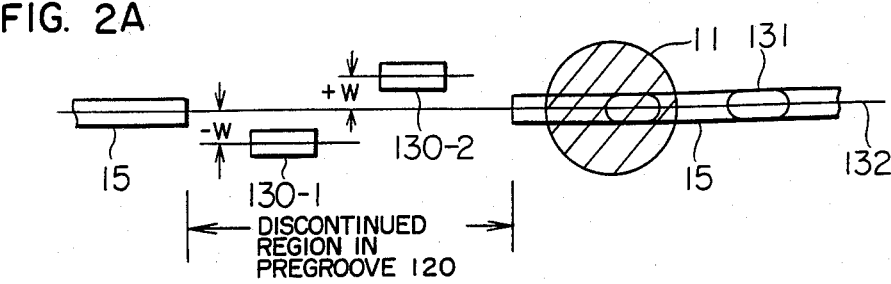
Figure 2B:
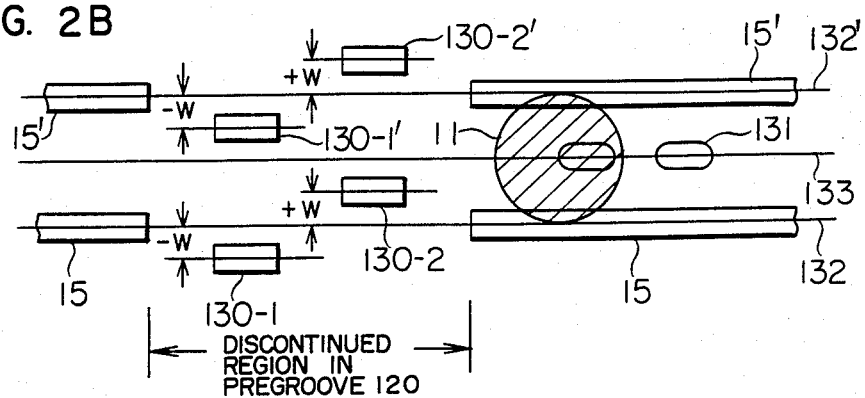
Figure 2C:
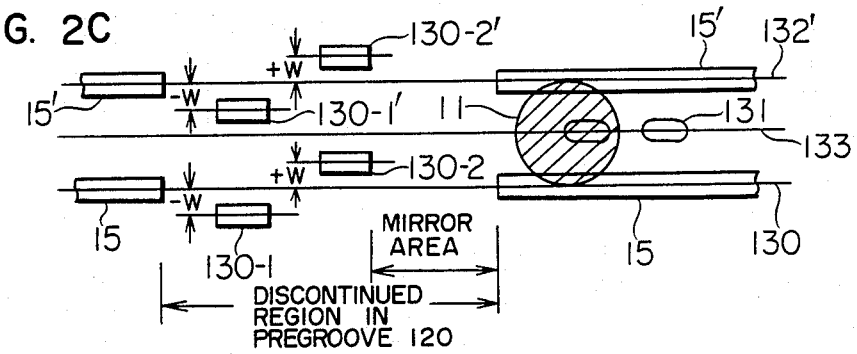

FIG. 2A illustrates an intra-groove recording in which data pits 131 are recorded and/or reproduced along the center line 132 of the pregroove 15, while FIG. 2B illustrates an inter-groove land recording in which data pits 131 are recorded and/or reproduced along the center line 133 between the adjacent pregrooves 15 and 15'. The discontinued or interrupted region 120 of the pregroove may be provided with a mirror surface area where no signal is recorded beside the wobbled tracking marks. Examples of such mirror surface area arrangement are illustrated in FIG. 2C for the case of the intra-groove recording and in FIG. 2D for the case of the inter-groove land recording, respectively. In the case of the example shown in FIG. 2C, one mirror surface area 134 is provided in succession to the wobbled tracking marks 130-1' and 130-2. However, the mirror surface area 134 is not necessarily to be provided at a position downstream of the wobbled tracking marks but can be formed at any location so long as the position of the mirror surface area 134 can be detected. Further, two or more mirror surface areas may be provided in each of the discontinued regions of the pregroove. In the case of the example illustrated in FIG. 2D, the mirror surface areas are provided at three locations, as indicated by 134-1, 134-2 and 134-3. The longitudinal length (length in the direction trackwise) of each of the mirror surface areas 134, 134-1, 134-2 and 134-3 is dimensioned sufficiently longer than the diameter of the light spot 11. The wobbled track marks, pregrooves or the preformatter sectors should preferably be formed at the time of preparation of the master so that they can be realized by forming a desired recording film on a disc substrate on which the master is transferred through replication technique. In the case of the ablative recording, the recording film may be formed, for example, of TeSePb-film containing Te as a main component. On the other hand, in the case of the magneto-optical recording, a vertically magnetized film formed, for example, of TbFeCo containing Tb and Fe as main components may be employed. Further, in the case of the phase-change recording, an amorphous film of Te-series may be employed.

Turning back to FIG. 1, the tracking servo system according to the present invention includes a push-pull servo loop 20 for detecting differentially the unbalance in the distribution of light undergone diffraction due to the pregrooves to derive a continuous track error signal, a wobbling servo loop 30 for detecting the unbalance in the quantity of reflected light from the wobbled track marks through a sampling procedure, and additionally an offset correcting loop 40 for detecting offset components produced due to the tilting, deformation and/or eccentricity of the disc or variations in optical and/or mechanical parameters occurring in the course of time lapse to thereby produce an offset correcting signal for compensating for the offset component.

In the push-pull servo loop 20, the output signals of the photoelectric detector array (transducer) 7 are subtracted from each other through a subtraction circuit 21 to detect the unbalance in the diffracted light distribution due to the pregrooves to thereby produce the track error signal 23 in a substantially continuous manner. In contrast, the wobbling servo loop 30 is designed to produce a signal representative of the track error or off-track deviation only intermittently. Under the circumstances, the output signals of the photoelectric detector array 7 are added together through an addition circuit 31 to derive a reflection light quantity signal which is then sampled and held by a sample and hold circuit 33 at a timing at which the light spot 11 passes over a pair of wobbled track marks 130-1 and 130-2 (in the case of the intra-groove recording illustrated in FIGS. 2A and 2D) or the wobbled track marks 130-1' and 130-2' (in the case of the intergroove land recording illustrated in FIGS. 2B and 2C) to determine the unbalance in the quantity of light reflected by the wobbled track marks through differential processing of the detection output signals mentioned above. By applying the output signal of the sample and hold circuit 33 to a low-pass filter 35, the track error (deviation) signal 37 can be obtained.

In the offset correcting loop 40, the offset component is detected through sampling procedure by making use of the reflected light from the wobbled track marks 130 provided at the discontinued regions 120 of the pregrooves or from the mirror surface areas 134. On the basis of the offset component thus detected, an offset correcting signal 41 is produced for cancelling out the detected offset component.

The push-pull track error signal 23 from the push-pull servo loop 20, the prewobbling track error signal 37 from the wobbling servo loop 30 and the offset correcting signal 41 from the offset correcting loop 40 are combined together by a combination circuit (also referred to as composite means) 50, the output signal of which is utilized for driving the tracking actuator such as the galvano-mirror 4 or the like after having been amplified through a power amplifier 19. The offset correcting system 40 according to the invention is realized in the form of an open loop for the feed-forward control. The combination circuit or composite means 50 can synthesize the three signals 23, 37 and 41 mentioned above in different combinations in dependence on the effects to be accomplished. By way of example, in the case of the tracking lead-in operation, the track error (deviation) signal 37 produced by the wobbling servo loop 30 can be exchangeably replaced by the offset correcting signal 41 outputted from the offset correcting system 40, which signal 41 is then combined with the track error signal 23 from the push-pull servo loop 20. More specifically, the push-pull servo loop 20 is first turned on to effect the tracking lead-in operation. At the time when the light spot is led to the vicinity of the track center, the offset correcting system 40 is turned on to detect the offset component immediately following the track lead-in operation mentioned above, whereby the offset correcting signal 41 for cancelling out the offset component as detected is added to the track error signal 23 from the push-pull servo loop 20. As the result, the light spot moves toward the track center by a distance for cancelling out the offset component. When the offset component as detected is reduced below a predetermined value, the offset correcting system 40 is turned off, while the wobbling servo loop 30 is turned on, whereby the push-pull track error signal 23 and the prewobbling track error signal 37 are added together. This means that the composite control system of the push-pull servo loop 20 and the wobbling servo loop 30 becomes now effective.

Further, the combination circuit (composite means) 50 can combine simultaneously the three signals 23, 37 and 41 mentioned above. For example, the push-pull error signal 23 may first be combined with the prewobbling error signal 37, the resultant composite error signal being then combined with the offset correcting signal 41. Alternatively, the push-pull error signal 23 may first be combined with the offset correcting signal 41, the resultant composite error signal being then combined with the prewobbling error signal 37. In this case, the offset correcting loop 40 is of course so operative as to compensate for the steady-state offset component. When the correcting value of the offset correcting system 40 becomes logically true, this means that the tracking system suffers no offset component. Nevertheless, some offset component will necessarily remain due to the error in the detection of the offset factors, variations of various parameters and the error attendant on the adjustment of the system. In that case, however, the wobble tracking loop 30 does operate to suppress the remnant offset component. Accordingly, the composite duplex servo system can be operated in the highly stable state without need for setting the gain and the frequency range of the wobbling servo loop 30, resulting in that tracking operation of high accuracy can be realized with high-speed response performance.

In this connection, it should be mentioned that the offset correcting loop 40 may be so designed that the offset information for one rotation of the disc or offset information increased or decreased progressively upon every track jump can be processed into individual independent offset correction signals or the composite offset correcting signal 40.

As will be appreciated from the foregoing description, in the case of the inter-groove land recording illustrated in FIGS. 2B and 2C, the laser beam 11 illuminating the disc surface is caused to follow up or track the center line 133 between the pregrooves 15 and 15' under the control of the push-pull loop 20, wherein the offset component contained in the push-pull error signal 23 is compensated for by the offset correcting loop 40, while the wobbling servo loop 30 is operative to suppress the remnant offset component, as the result of which the tracking operation is performed along the center line between the wobbled track marks 130-1' and 130-2. Accordingly, in the case of the inter-groove land recording, the center line 133 between the two adjacent pregrooves is the center of the track. In that case, one wobble mark 130-1' is formed at a position deviated from the pregroove center line 132 by a distance of (−) W (where W=0.4 μm in the case of the illustrated embodiment), while the other wobbling mark 130-2 is formed at the position deviated from the pregroove center line 132 by a distance of (+) W. In this manner, with such arrangement that the pair of wobbled tracking marks are provided between the two adjacent pregrooves in the form of the pit 130-1 spaced from the center line 132 of the one pregroove 15' by the predetermined distance mentioned above and the pit 130-2 formed at the position spaced by the predetermined distance from the center 132 of the other pregroove 15 so that the wobble track error signal is detected on the basis of the wobbled tracking marks with reference to the center line 132 between the pits 130-1' and 130-2, it is possible to record and/or reproduce data of the pit 131 on the inter-pregroove land without being affected by adverse influence due to the difference between the target values of the push-pull error signal and the wobble track error signal, because the center line of the wobbled tracking marks substantially coincides with the inter-pregroove center line 133.

Figure 2D:
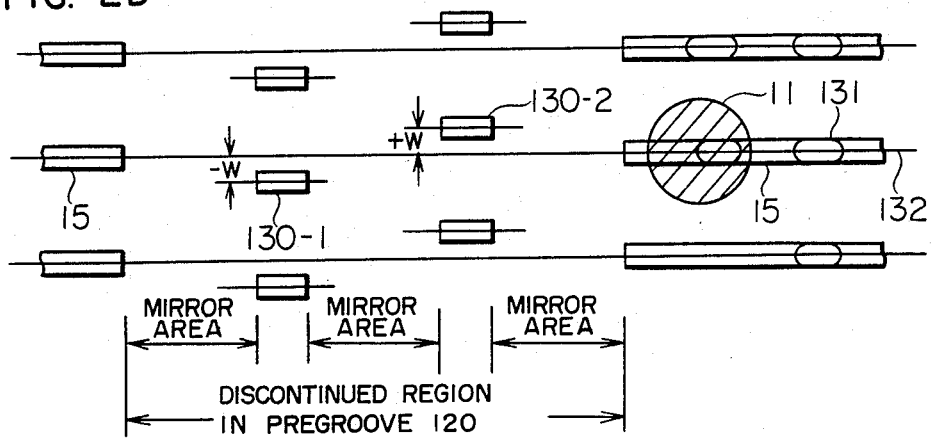

On the other hand, in the case of the intragroove recording illustrated in FIGS. 2A and 2D, the tracking with the laser beam 11 is performed with reference to the center line 132 of the pregroove under the control of the push-pull loop 20 with the offset component being cancelled by the offset correcting loop 40, while the wobble tracking loop 30 is operative to suppress the remnant offset component, as the result of which the tracking with the laser beam takes place along the center line between the wobbled track marks 130-1 and 130-2. In other words, the center line 132 of the pregroove defines the center of the track.

Figure 3:
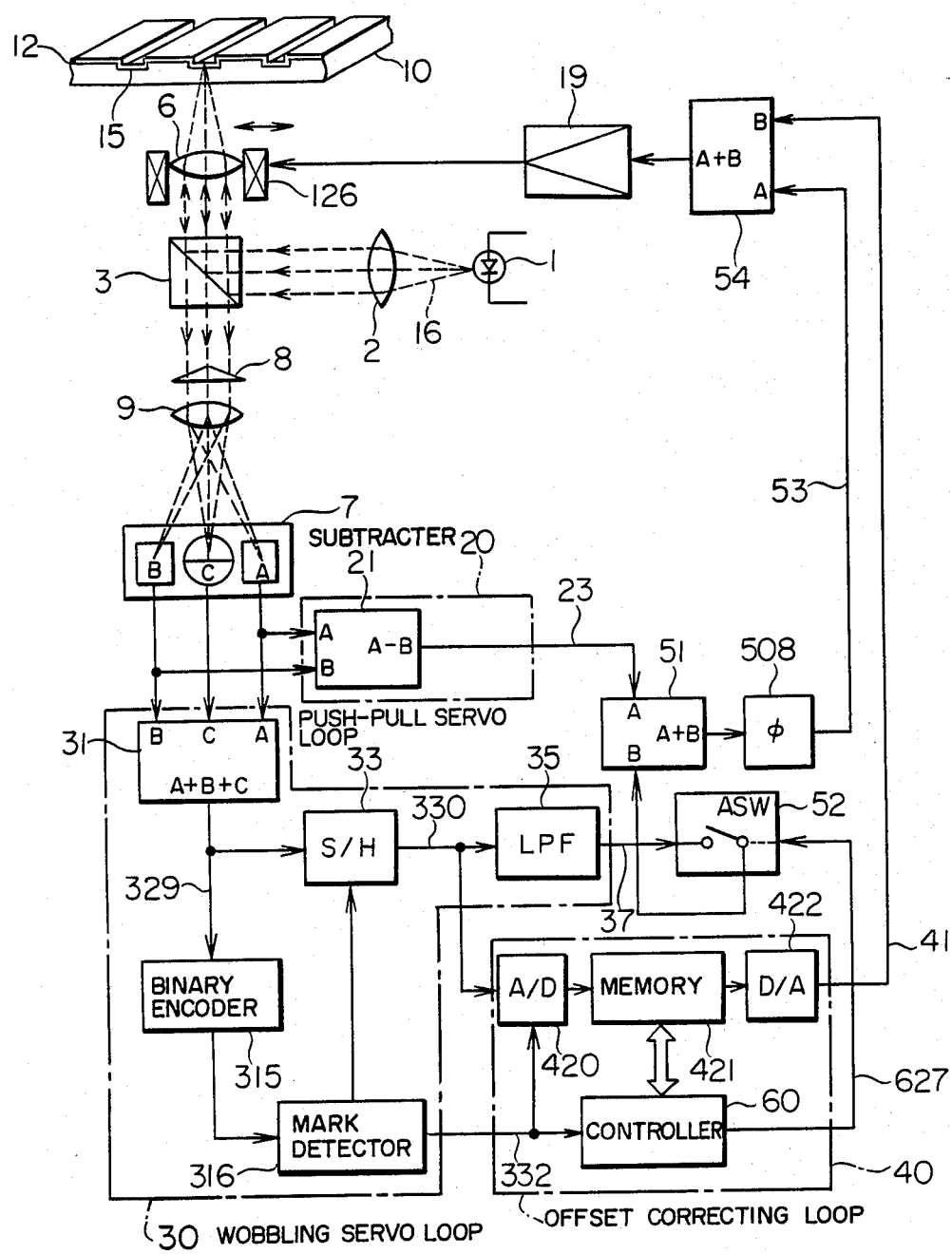
FIG. 3 is a view showing in a block diagram a general arrangement of the tracking servo system according to a first embodiment of the invention.

FIG. 3 shows an exemplary embodiment of a composite tracking servo system incorporating additionally the offset correcting loop according to the teaching of the present invention. Referring to FIG. 3, a laser beam emitted by a semiconductor laser 1 is collimated by a lens 2 and reflected by a half-mirror 3 to be focused onto a recording surface 12 of the optical disc 10. The laser beam reflected by the disc 10 passes through the objective lens 6 in the reverse direction to be transmitted through the half-mirror 3 and divided into two halves by the prism 8 serving also as the knife edge. One of the light beams resulting from the splitting is focused onto light receiving face C of a photoelectric detector 7C of a detector array 7 through a condenser lens 9 to, be converted into an focus detecting signal. The other beam resulting from the splitting is further divided under the action of the prism 8 to be focused onto photoelectric detectors 7A and 7B of the detector array 7 to be converted into electric signals representative of the light distribution diffracted by the pregrooves 15. The output signals of the detectors 7A and 7B are applied to a subtraction circuit 21, the difference output signal of which is the push-pull tracking error signal 23. On the other hands, the output signals of the photoelectric detectors 7A, 7B and 7C are added together by an addition circuit 31, whereby a reflected light quantity signal indicative of magnitude of intensity of the laser light reflected from the disc 10 is obtained as the information signal 329. This signal 329 is converted into a binary signal through a binary coding circuit 315 and applied to a mark detecting pattern matching circuit 316 for the purpose of recognizing the wobbled track marks 130-1 and 130-2. The signals representative of the wobbled marks as contained in the information signal 329 is sampled with respect to the peak values occurring due to the preceding and succeeding pits, respectively, by a sample and hold type subtraction circuit 33 under the command of a mark detection circuit 316, whereby an output signal representative of difference between the samples is obtained as an original wobbling error signal 330 which is then supplied to a low-pass filter 35 for eliminating high-frequency components, the output signal of the low-pass filter 35 being used as the wobbling track error signal 37. In the case of the conventional composite tracking system, the wobbled track error signal 37 and the push-pull track error signal 23 are combined by an addition circuit 51 to derive a composite track error signal 53 by way of a phase compensation circuit 508, the composite error signal 53 being then utilized for driving an actuator 126 through a power amplifier 19 to thereby perform the tracking operation. According to the instant embodiment of the invention, such an arrangement is adopted in which an offset correcting loop 40 is additionally provided in combination with the conventional tracking system mentioned above. More specifically, the original wobbling track error signal 330 is supplied to an analogue-to-digital or A/D converter 420 of the offset correcting loop in addition to the aforementioned low-pass filter 35 to be digitized under the timing of a mark detection pulse signal 332 produced by the mark detection circuit 316 and stored in a memory 421. The data thus stored undergoes the processing such as elimination of noise, smoothing processing and others through a controller 60 to be again stored in the memory 421. The output data signal of the memory 421 undergone the processing mentioned above is converted into an analogue signal by a digital-to-analogue or D/A converter 422, which signal represents an offset correcting signal 41. The latter is then mixed with the composite error signal 53 by an addition circuit 54, the resultant composite signal being utilized for driving the actuator 126 through the power amplifier 19. A reference numeral 52 denotes an analogue switch adapted to be turned on and off in response to a control signal produced by the controller 60. When the analogue switch 52 is off, the push-pull tracking mode is established, while in the on-state of the switch 52 the composite tracking mode is effective.

Figure 4:
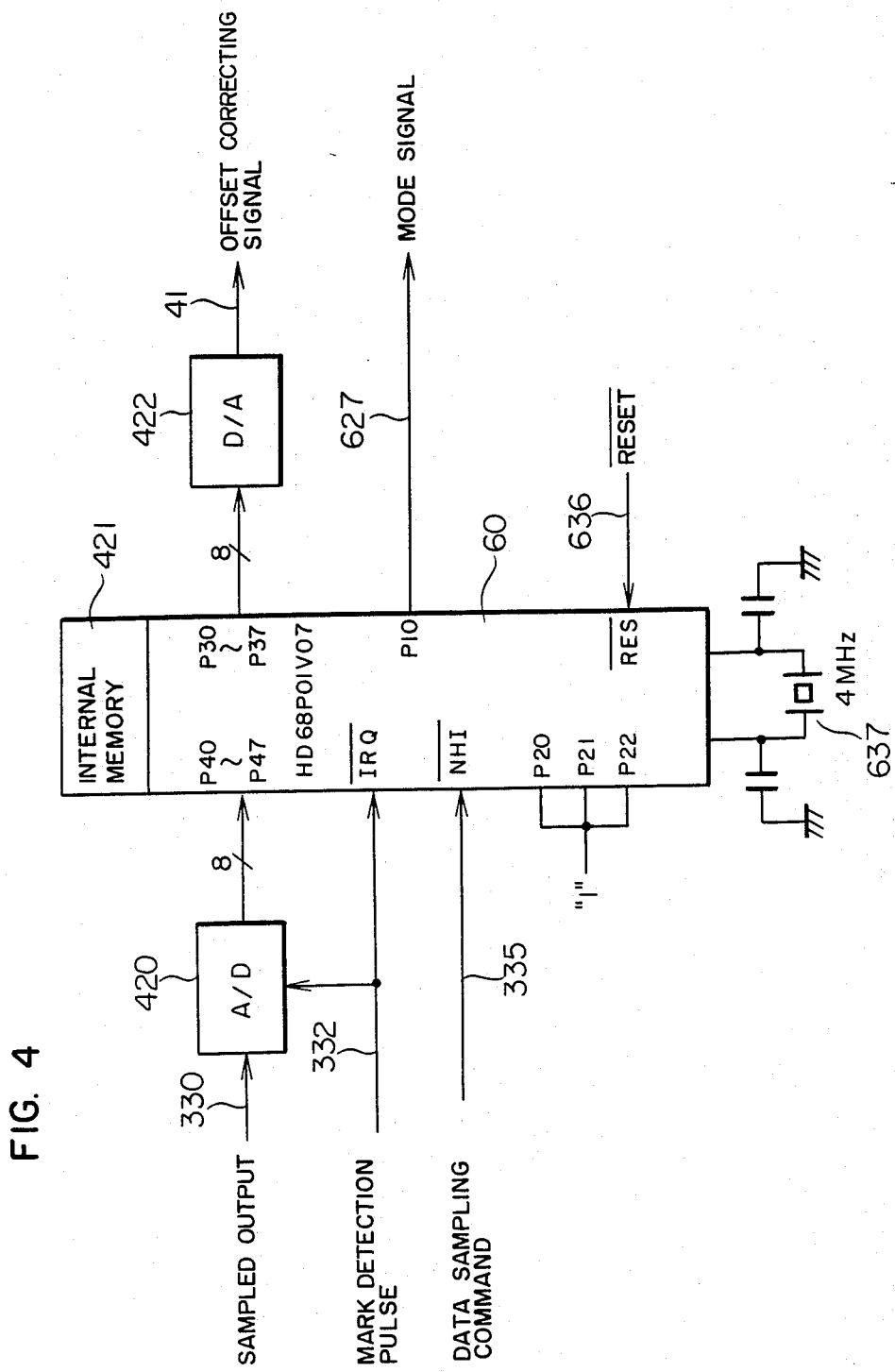
FIG. 4 is a view for illustrating the structure of a controller used in the system shown in FIG. 3 and constituted by a single-chip microprocessor.
Figure 5:
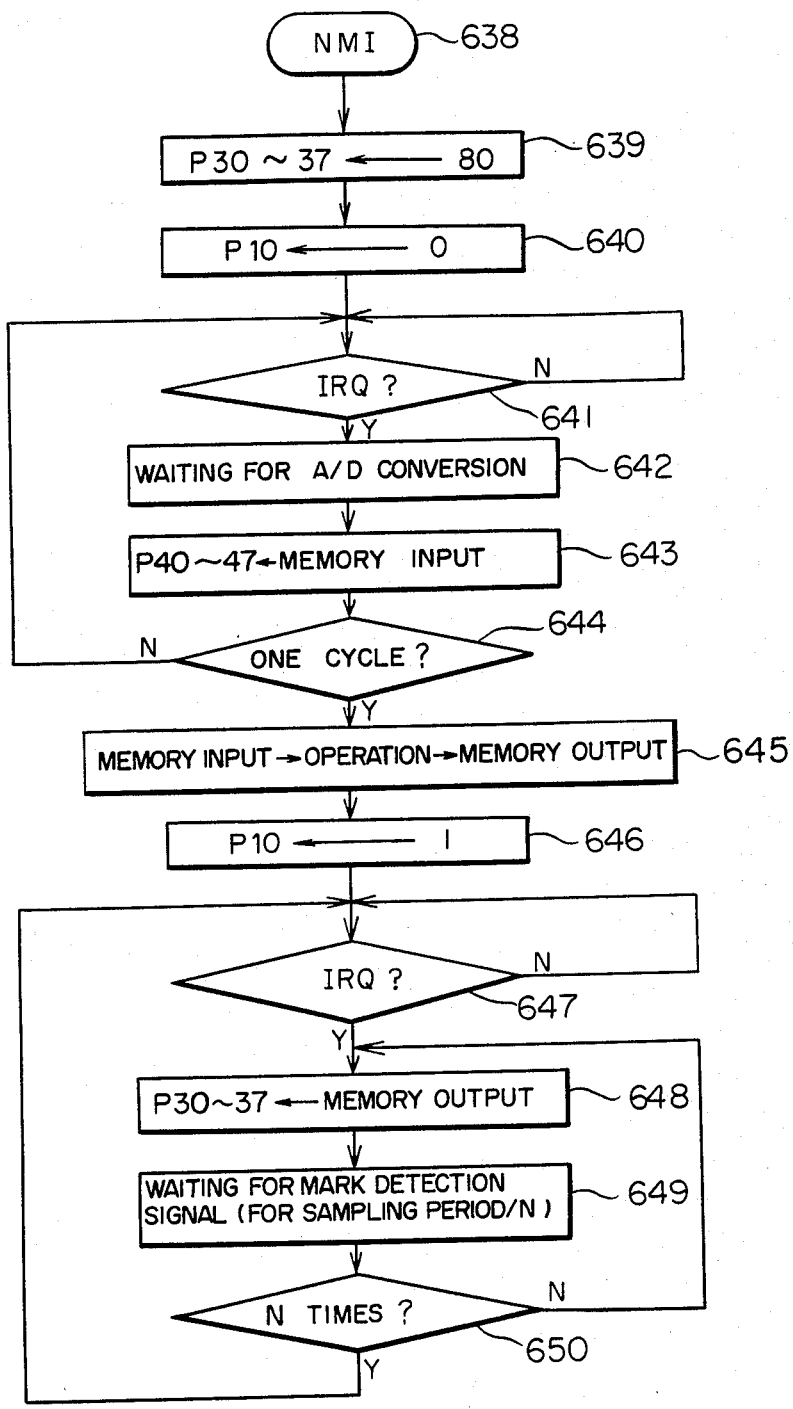
FIG. 5 is a view showing a flow chart for illustrating operation of the system according to the first embodiment shown in FIG. 3.

Next, operation of the composite tracking servo system according to the instant embodiment of the invention will be described with reference to FIGS. 4 and 5, wherein FIG. 4 shows an exemplary circuit configuration in which the controller 60 shown in FIG. 3 is constituted by a single chip microprocessor "HD3P01V07" commercially available from Hitachi Ltd., Japan and FIG. 5 is a flow chart for illustrating the operation of the system. Upon inputting of a reset signal 636, the controller or processor 60 is initialized to a single chip mode in which the processor is set to the state ready for operation under the clock of 4 MHz generated by a quartz oscillator 637. When a data sample command 335 is issued from a host controller in this state and applied to a NMI (non-maskable interrupt) terminal of the processor 60, this means that an unconditional cause for interrupt occurs, as the result of which the operation illustrated in the flow chart shown in FIG. 5 is unconditionally initiated (step 638). At first, data is so set that the output of the offset correction signal generating D/A converter 422 is 0 (zero) volt (step 639, FIG. 5), while the mode signal 627 is set to logic "0" so that the analogue switch 52 shown in FIG. 3 is in the off-state (step 640, FIG. 5), whereby there is established the state waiting for application of the mark detection pulse 332 to an IRQ (interrupt request) terminal (step 641, FIG. 5). When the wobbled mark is detected in this state, the mark detection pulse 332 is inputted, whereby the original wobbling track error signal 330 is digitized by the A/D converter 420, the resulting digital data being applied to input ports P40 to P47 of the single chip microprocessor 60. On the other hand, the microprocessor is released from the stand-by state waiting for the interrupt request (step 641, FIG. 5) and, after the lapse of time required for digitizing the analogue information by the A/D converter 420 (step 642, FIG. 5), fetches the digitized original wobbling track error signal which is then stored in an input memory area of an internal memory of the processor 60 (step 643, FIG. 5). It is then decided whether data of the original wobbling track error for one turn of the track (i.e. the steady track offset information for one rotation of the disc) has been collected or not (step 644, FIG. 5). If the answer of the decision step 644 is negative, the microprocessor 60 assumes the stand-by state waiting for the IRQ (interrupt request) signal. Otherwise, the data of the original wobbling track error stored in the input memory area is subjected to the arithmetic operation or processing for noise elimination, data interpolation and the phase shifting, the results of the operation being stored in an output area of the internal memory incorporated in the processor (step 645, FIG. 5). Subsequently, the mode signal 627 is set to logic "1" to change over the current state to the composite tracking mode (step 645, FIG. 5), whereby the stand-by state waiting for the mark detection timing signal is established (step 647, FIG. 5). When the mark is detected with the IRQ being issued, the data of the output memory area is transferred to output ports P30 to P37 for supplying the data to the D/A converter (step 648, FIG. 5), while interpolation data is outputted N times for making smoothly continuous the wobbling track error data sampled at discrete periods, and the mark detection pulse 332 for the next mark is awaited (steps 649 and 650, FIG. 5). Thereafter, by repeating the operation described above, the offset correcting signal 41 is outputted as the continuous analogue data signal for effecting the correction of the steady-state offset component.

Figure 6:
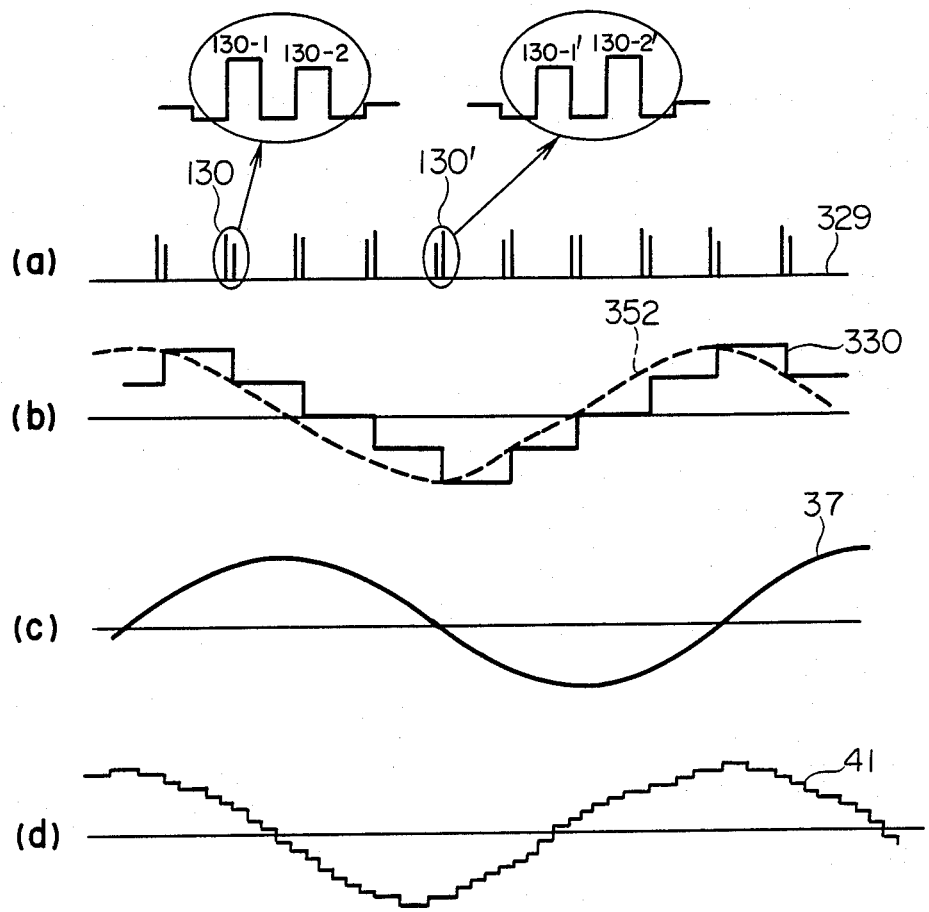
FIGS. 6(a-d) is a view showing signal waveforms produced by main circuit components of the system.

FIG. 6 shows waveform diagrams for explaining complementarily the composite tracking servo system according to the first embodiment of the invention described above. Referring to FIG. 6, there is shown the waveform of the information signal 329 at (a). The signals representing the wobbling marks are denoted by 130 and 130', wherein the signals corresponding to the preceding pits are denoted by 130-1 and 130-1', while those corresponding to the succeeding pits are denoted by 130-2 and 130-2'. In FIG. 6 at (b), there is illustrated, by way of example, the waveform of the original prewobbling track error signal 330, the attendant actual offset being indicated by a broken line curve 352. Shown in FIG. 6 at (c) is the waveform of the wobbling track error signal 37 which is obtained by passing the original wobbling error signal 330 through the low-pass filter 35 of 30 Hz. It will be seen that the wobbling error signal 37 has a phase lag relative to the offset indicated by the broken line curve 352. Shown in FIG. 6 at (d) is the waveform of the finally obtained offset correcting signal 41, from which it will be seen that the original signals 330 shown at (b) is finely interpolated stepwise and processed by the single-chip microprocessor 60 so as to coincide with the actual offset signal 352 in respect to the phase. Thus, the predicted offset correction can be accomplished with high reliability.

According to the first embodiment of the invention described above, it is possible to set the gain of the wobbling servo loop 30 at a sufficiently small value in the sampling frequency range for detecting the wobbling track error, whereby a hunting phenomenon otherwise possibly taking place in dependence on the ratio to the gain of the push-pull servo loop 20 can be positively prevented. In this manner, there is realized a tracking servo system which can remain stable regardless of the relative change in the gains of the two servo systems.

Figure 7:
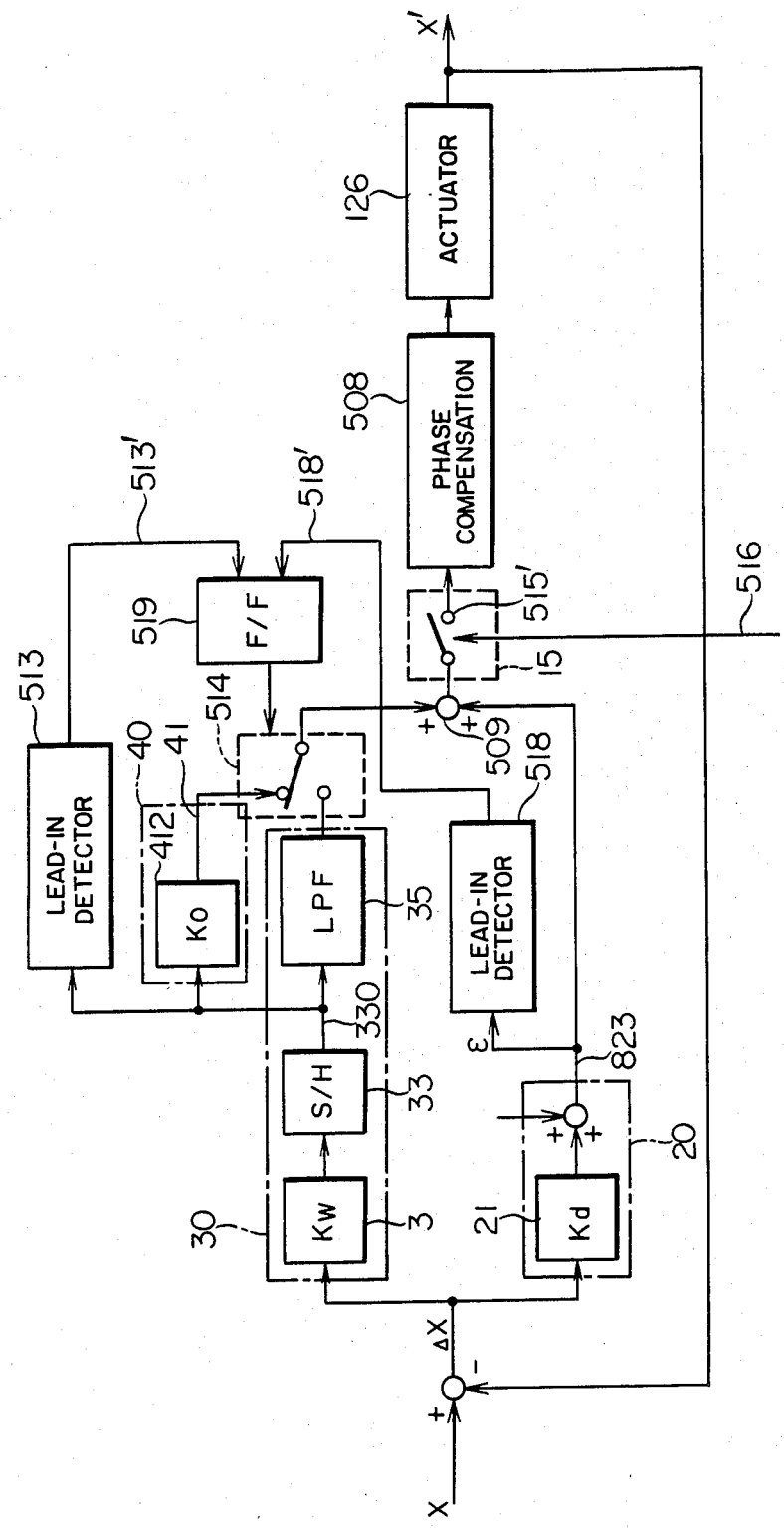
FIG. 7 is a view showing a general arrangement of a second embodiment of the invention.

Next, a second embodiment of the present invention will be described in which the offset correcting loop is made use of for the tracking lead-in operation by referring to a block diagram shown in FIG. 7. According to the teaching of the invention incarnated in this embodiment, the offset produced immediately after the lead-in operation is detected by the prewobbling detection method, whereby an electric offset for cancelling the detected offset is produced by an offset correcting loop 40 to be fed to the servo system in an open-loop fashion. When the offset component 330 detected by the prewobbling detection loop goes below a predetermined value, the composite control loop composed of the prewobbling servo loop 30 and the push-pull servo loop 24 is rendered operative.

Figure 8:
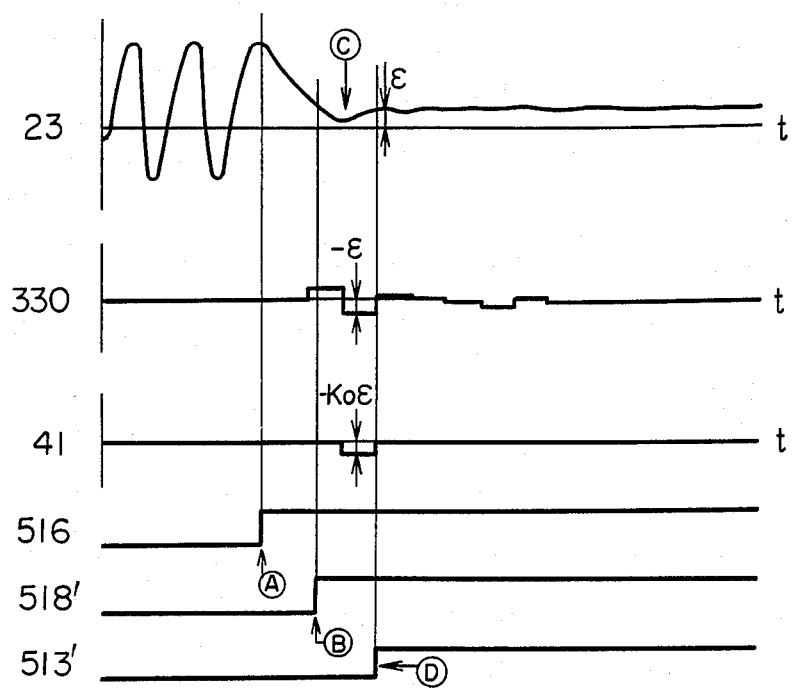
FIG. 8 is a view showing waveforms for illustrating operation of the second embodiment.

Operation of the instant embodiment will be elucidated with reference to the time chart shown in FIG. 8. A signal waveform 23 represents the tracking signal of the push-pull loop 20 which assumes a sinusoidal waveform when this control loop is opened (i.e. when a switch 515 is off). Upon closing of the switch 515 at a time point A shown enclosed in a circle in response to the signal 516 supplied from a host controller, only the push-pull loop 20 having a detection sensitivity Kd becomes operative in the tracking servo system to control such that a difference represented by $\Delta X$ is reduced, because no tracking signal is obtained from the prewobbling loop 30 yet at this time point (refer to waveform 330). When the light spot 11 is led to the vicinity of the track center through the operation of the push-pull loop 20, the offset correcting loop 40 is put into effect at a time point denoted by B in circle, resulting in that the prewobbling detection loop (Kw) starts operation thereof. In this case, assuming that an offset $\epsilon$ intervenes in the push-pull loop 20, the light spot 11 is located at a position deviated from the track center by $(-)\epsilon$ when the track error signal 23 becomes zero at the time point denoted by C in circle. As the result, the tracking deviation $(-)\epsilon$ due to the offset can be detected by the prewobbling detection loop (Kw). Accordingly, after multiplication with a factor Ko required for the actuator 126 to move the light spot by $(-)\epsilon$ through an amplifier 412 incorporated in the offset correcting loop 40, the signal 330 is applied to the loop through the switch 514 without being caused to pass through the low-pass filter 35. Consequently, the light spot 11 is moved toward the center of the track. However, there makes appearance in the push-pull error signal 23 the offset component $\epsilon$. However, the value of the sampled prewobbling error signal 330 approximates to zero. When the sampled prewobbling error signal is stabilized in the vicinity of zero, a lead-in detector 513 (a sort of window comparator) becomes operative to change over the switch 514 through a flip-flop 519 at a time point designated by D in circle to thereby insert the prewobbling servo loop 30 to the control loop.

Simultaneously, reverse offset $(-)$ Ko$\epsilon$ forcibly applied by the offset correcting loop 40 is removed. In this manner, the light spot can be stabilized substantially at the track center within a much shorter time as compared with such procedure in which the error signal of the prewobbling detecting loop is initially applied to the control system through the low-pass filter 35. The embodiment of the invention under consideration is advantageous in that the light spot can be forcibly moved to the center of the track with higher accuracy because the tracking deviation can be determined by the prewobbling detection process which is very insusceptible to the influence of the offset.

Next, other embodiments of the present invention will be described by referring to FIGS. 9 to 11. In the case of the first and second embodiments of the invention shown in FIGS. 3 and 7, respectively, the correction of positional deviation of the light spot by the offset correcting loop 40 is performed on the basis of the error signal obtained through the prewobbling detection procedure. In contrast, in the case of the embodiments described below, the offset correction is performed with the aid of the signal obtained with the mirror surface areas 134, 134-1 or 134-3 previously provided at discrete portions of the track.

Figure 9:
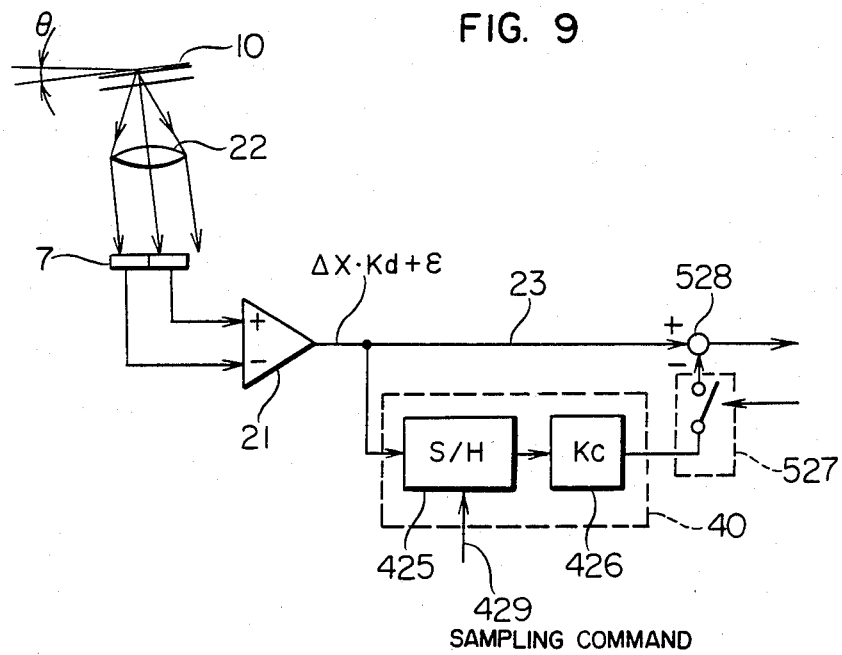
FIG. 9 is a view for illustrating the principle of the offset detection by using mirror surface areas.

FIG. 9 shows, by way of example, a circuit configuration for estimating an offset component $\epsilon$ with the aid of the mirror surface area.

When the disc 10 is tilted by an angle $\theta$ or when deviation from the optical axis takes place, the center of the two-splitted beam detector array 7 becomes out of coincidence with the optical axis in the case of the push-pull detection method, providing a cause for the occurrence of offset. Under the circumstances, for correcting the offset, difference in the quantity of light received by the photoelectric detector array 7 at the time point when the light spot comes to the position over the mirror surface area 134, 134-1, 134-2 or 134-3 described hereinbefore in conjunction with FIG. 2 is detected by the differential amplifier 21 and dealt with as a sort of the offset component. The signal 23 represents the combination of the track error signal detected by the push-pull loop with the offset component $\epsilon$ when the light spot lies o the pregroove. Accordingly, the unbalance component detected at the mirror surface area is held by the sample and hold circuit 425 and multiplied with an appropriate correction coefficient Kc by the multiplier circuit 426. The resultant product is regarded as the offset component ε which is then subtracted from the signal produced when the light spot is located on the pregroove to thereby cancel the offset component. It should be mentioned that the sampling command signal 429 functioning to control the sample and hold circuit 425 is produced at the time the light spot has attained the position of the mirror portion. The principle of the correction method in which the mirror surface area is employed will be understood from the above description. For particulars of the offset detection method by making use of the mirror surface area, reference may be made to U.S. Ser. No. 515,520 filed July 20, 1983, now U.S. Pat. No. 4,663,751 or Japanese patent application Laid-Open No. 19256/1984 (JP-A-59-19256).

Figure 10:
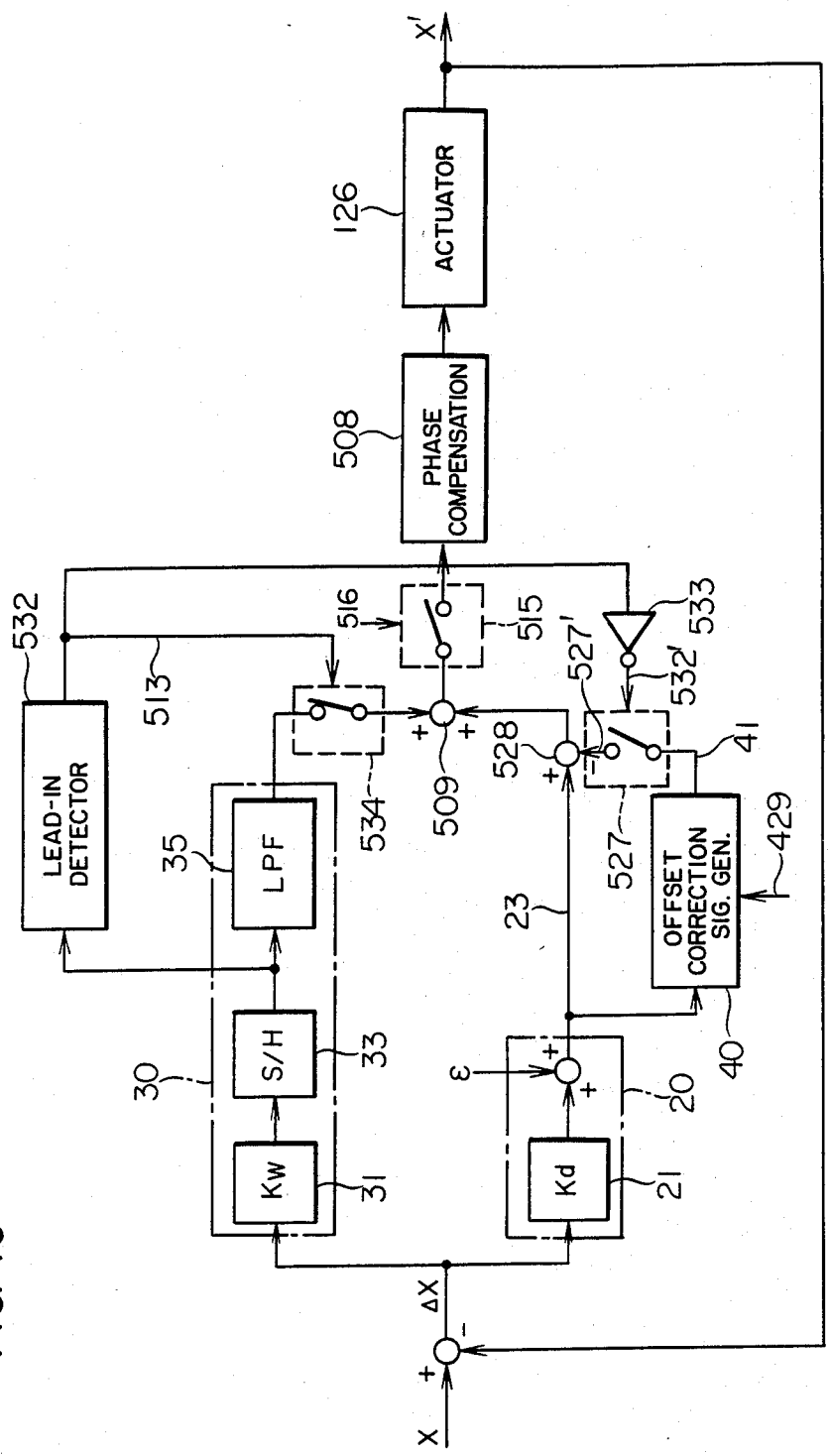
FIG. 10 is a view showing a general arrangement of the system according to a third embodiment of the invention.

FIG. 10 shows in a block diagram an arrangement of the tracking servo system according to an embodiment of the invention to which the aforementioned principle is applied. Operation of this system will be elucidated below by referring to the timing diagram illustrated in FIG. 11.

Figure 11:
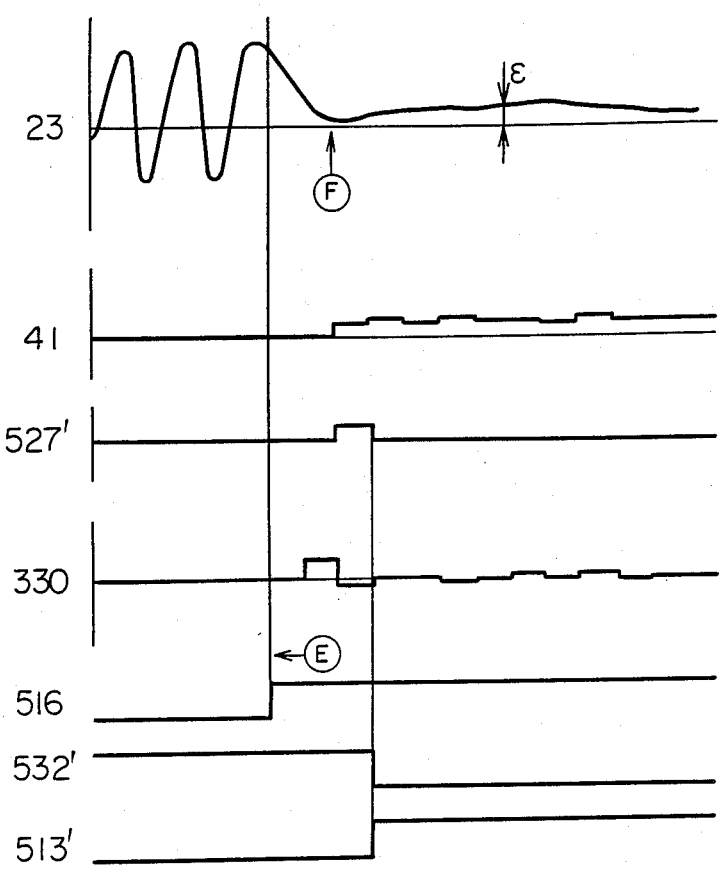
FIG. 11 is a view for illustrating operation of the third embodiment.

In FIG. 11, there is shown at 23 a waveform of the error signal of the push-pull loop 20. Assuming that the tracking is initiated at a time point denoted by E shown enclosed in a circle in response to a signal 516 with the switch 515 being closed, only the push-pull control loop 20 becomes operative immediately after the start of the tracking operation, as the result of which the push-pull signal containing the offset component ε becomes zero at the time point denoted by F in circle, as in the case of the embodiment shown in FIG. 7. However, in actuality, the point F is deviated from the track center under the influence of the offset. A signal 41 representative of this deviation is produced by the offset correction generator 40 (composed of the sample and hold circuit 425 and the factor multiplication circuit 426 shown in FIG. 9) which is operative in response to the mirror surface portion. The offset component is corrected by this output signal 41, whereby the light spot 11 is stabilized at the position in the vicinity of the track center. Thereafter, when the tracking lead-in detector 532 detects that the magnitude of error 330 due to the prewobbling method is converged within a predetermined range, the switch 534 is closed to make operative the composite control loop composed of the push-pull loop 20 and the prewobbling loop 30, while the switch 527 is opened to inhibit the offset correction loop 40 from applying the correcting signal to the control system. Through the procedure described above, the process from the start of the servo control operation to the changing-over to the composite control loop has been completed.

It will be understood that the embodiment of the invention mentioned above makes it possible to record or reproduce information or data with high accuracy from the time point immediately after the tracking lead-in operation by virtue of the correcting function based on the mirror surface area.

As will now be seen from the foregoing description, in the composite control system composed of the prewobbling loop and the push-pull loop according to the instant embodiment, the offset is forcibly cancelled out by effecting temporarily the feed-forward control by the offset correcting loop 40 immediately following the leading operation, whereby the reading and writing of information is made possible immediately after the lead-in operation. Thus, the tracking stability is improved while the access to information can be realized at a high speed.

Figure 12:
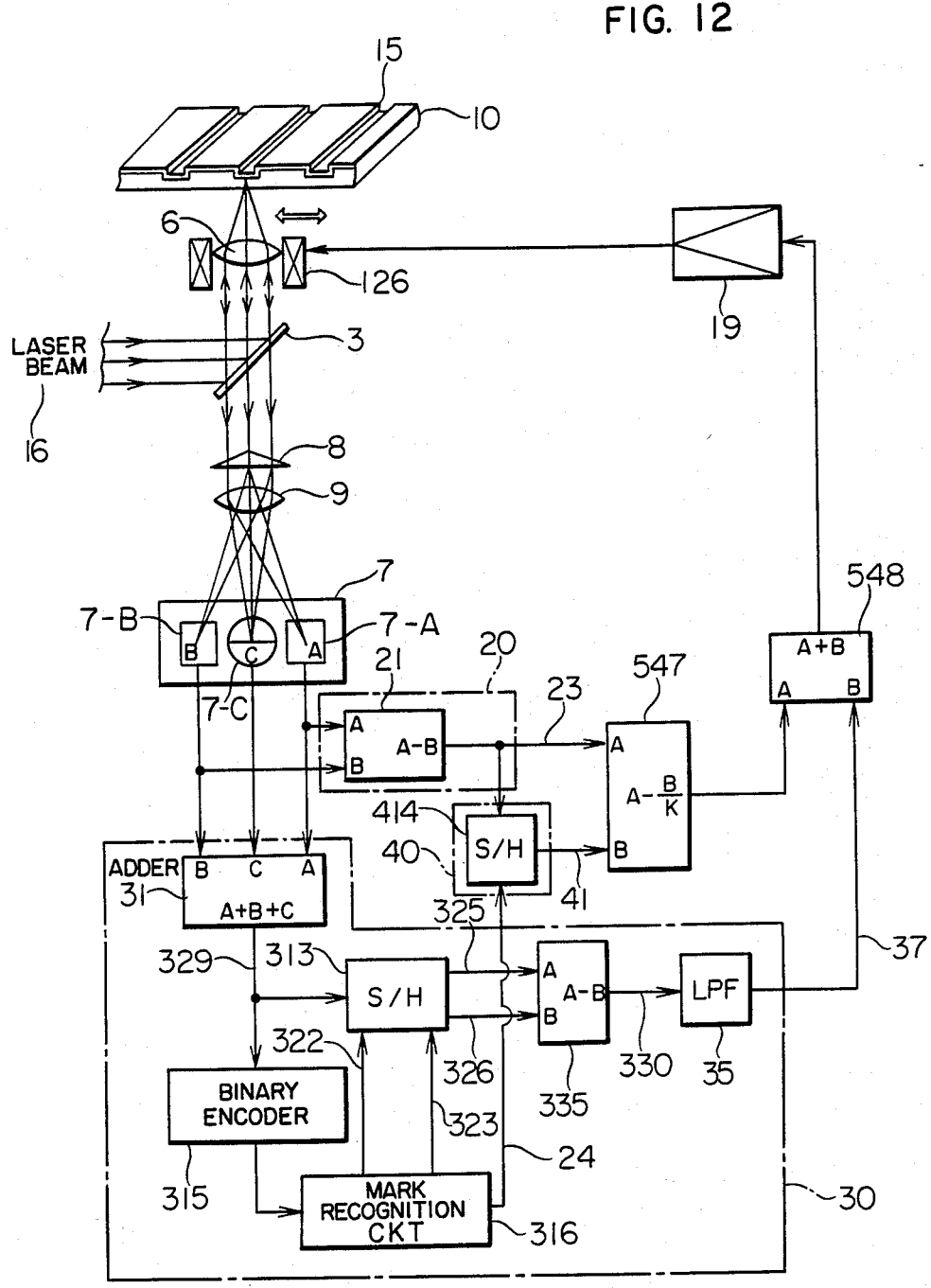
FIG. 12 is a view showing in a block diagram a fourth embodiment of the invention.
Figure 13:
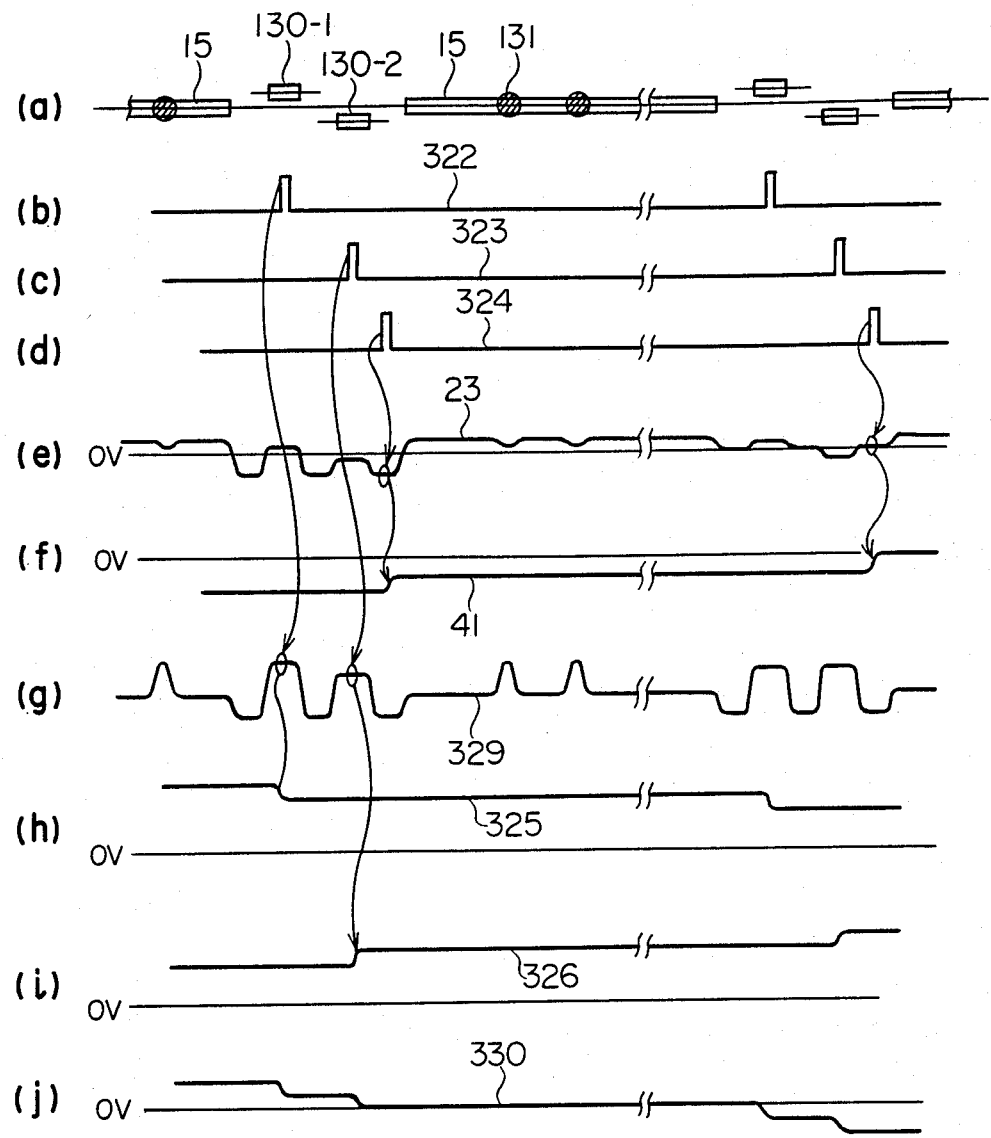
FIGS. 13(a-j) is a view showing signal waveforms produced at various circuit points in the system shown in FIG. 12.

FIG. 12 shows in a functional block diagram a general arrangement of the tracking servo system according to still another embodiment of the invention, and FIG. 13 illustrate signal waveforms produced at various circuit points of the system shown in FIG. 13. In the following, the system shown in FIG. 12 will be described by referring to FIG. 12. A coherent laser beam 16 emitted from the semiconductor laser impinges on an objective lens 6 through a beam splitter 3 to be focused onto an optical disc 10 for irradiation thereof in the form of a light spot having a very small diameter. The reflected light of the light spot from the disc surface and the light diffracted by the pregrooves 15 pass through the objective lens 6 and the beam splitter 3 in the reverse direction to be divided and polarized under the action of a prism 8 and finally condensed through a lens 9 to the light receiving faces of the detector array 7. A subtractor 21 determines the difference between the output signals of the detectors 7A and 7B to which the diffracted light from the pregrooves 15 is directed to thereby derive a push-pull track error signal 23 (refer to FIG. 13 at e). On the other hand, an adder 31 combines the output signals of the detector 7A and 7B with the output signal of a detector 7C provided for the autofocusing operation to thereby produce a signal 329 representative of bright and dark areas on the disc track (see FIG. 13 at g). The brightness/darkness signal 329 is then coded into a binary signal by a binary coding circuit 315 to be subsequently inputted to a wobbled mark recognition circuit 316. The wobbled mark recognition circuit 316 produces a primary sample pulse 322 (see FIG. 13 at b) in response to the recognition of the preceding wobbled pit 130-1, while producing a secondary sample pulse 323 (see FIG. 13 at c) in response to the recognition of a succeeding wobbled pit 130-2. Further, the circuit 316 produces a tertiary sample pulse 324 (see FIG. 13 at d) in response to the recognition of the mirror surface area. It should be mentioned that a plurality of the tertiary samples may be produced at the timing determined by any one of three mirror surface areas indicated by 134-1, 134-2 and 134-3, respectively, in FIG. 2D. The primary sample pulse 322 and the secondary sample pulse 323 control the sample and hold circuit 313 for detecting the wobbling track error signal to derive a preceding wobble signal 325 (FIG. 13, h) and a succeeding wobble signal 326 (FIG. 13, i). Difference between the signals 325 and 326 is determined by a subtraction circuit 335 to produce a sample wobbling track error signal 330 (FIG. 13, j) to be inputted to a low-pass filter 35. On the other hand, the tertiary sample pulse 324 is inputted to a sample and hold circuit 414 for sampling the mirror area signal from the push-pull track error signal 23 to derive the offset correcting signal 41 (FIG. 13, f), which undergoes subtraction with the push-pull track error signal 23 containing the offset component through a subtractor 547 having also a division function. The wobbling track error signal 37 having passed through a low-pass filter 35 and the push-pull track error signal having compensated for in respect to the offset component (which signal however contains in actuality the remnant offset component due to error attendant on adjustment and offset component due to variations in the parameters) are combined by an addition circuit 548, the output signal of which is amplified by a power amplifier 19 to be utilized for driving a tracking actuator 126 to move the objective lens in the horizontal direction (so-called lens shift), whereby the so-called desired track tracking operation is performed.

Figure 14:
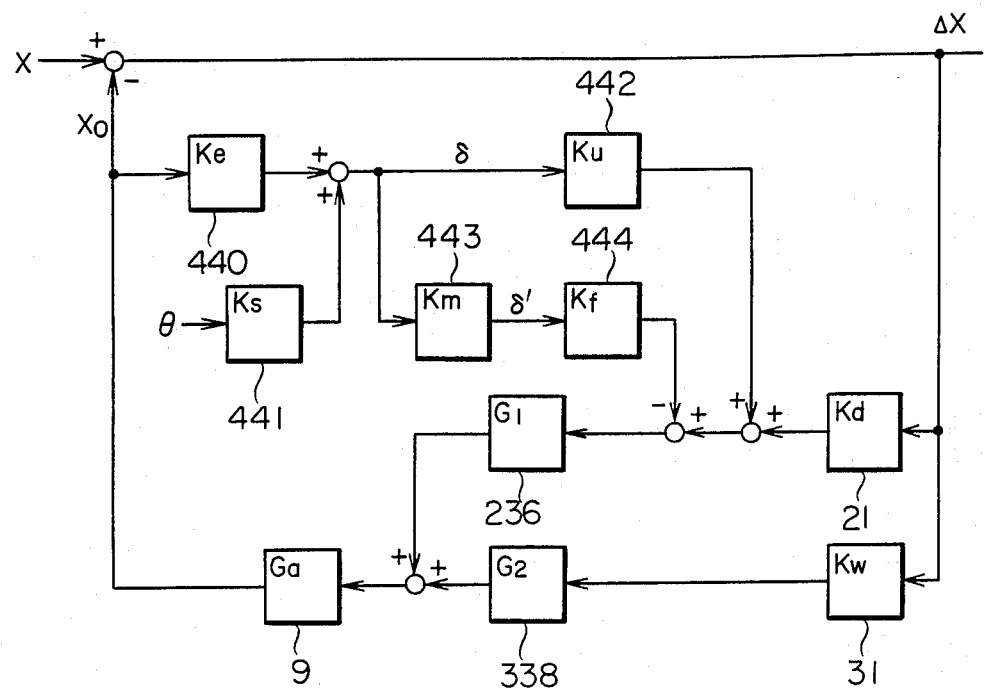
FIG. 14 is a view showing in a block diagram a fifth embodiment of the invention.

FIG. 14 shows the circuit arrangement of FIG. 12 in a block diagram for servo analysis with only the low-frequency components being considered for convenience of illustration. In FIG. 14, a block 21 represents detection sensitivity Kd for the push-pull track error, a block 236 represents amplification gain $G_1$ of the push-pull loop, a block 31 represents detection sensitivity Kw of the wobbling track error, a block 338 represents amplification gain $G_2$ of the wobbling loop, a block 9 represents operation sensitivity Ga of the tracking actuator 126, a block 440 represents an optical axis deviation factor Ke involved in the shift of the light spot (lens shift), a block 441 represents an optical axis deviation factor Ks attendant on the angle of tilting of the disc, a block 442 represents optical axis deviation offset sensitivity Ku, a block 443 represents mirror face signal detection sensitivity Km, and a block 444 represents optical axis deviation offset correcting factor Kf. Further, X represents a desired tracking value, $\Delta X$ represents a track offset, $X_o$ represents displacement of the light spot, $\theta$ represents the angle of the tilting of disc, $\delta$ represents magnitude of the optical axis deviation on the disc surface, and $\delta'$ represents magnitude of optical axis deviation detected at the mirror face portion. Under the conditions, a loop transfer function is given by the following expression:

$$\Delta X = \frac{1}{(Kd \cdot G_1 + Kw \cdot G_2) \cdot Ga} \cdot X - \qquad (1)$$

$$\frac{G_1}{Kd \cdot G_1 + Kw \cdot G_2} \cdot \delta \ (Ku - Km \cdot Kf)$$

where the first term represents the steady-state deviation term and the second represents the remnant offset suppressing term for the offset correcting loop employing the mirror surface area. By the way, in the case of the system including no open correcting loop 40, i.e. when Km=0 (meaning that no open correcting loop is incorporated), the one-cycle transfer function is given by the following expression:

$$\Delta X = \frac{1}{(Kd \cdot G_1 + Kw \cdot G_2) Ga} \cdot X - \qquad (2)$$

$$\frac{G_1}{Kd \cdot G_1 + Kw \cdot G_2} \cdot \delta \cdot Ku$$

when the offset component $\delta \cdot (Ku - Km \cdot Kf)$ to be suppressed in the expression (1) has been corrected by a factor of ¼ of the offset component $\delta.Ku$ in the expression (2), the gain $Kw \cdot G_2$ of the wobbling loop in the system according to the instant embodiment may be set to the smaller than a half of the corresponding gain in the expression (2) while assuring the track center tracking capability equivalent to or higher than that of the system given by the expression (2). In this manner, there is realized a composite wobbling type tracking system having an increased operation margin for variation in gain.

Figure 15:
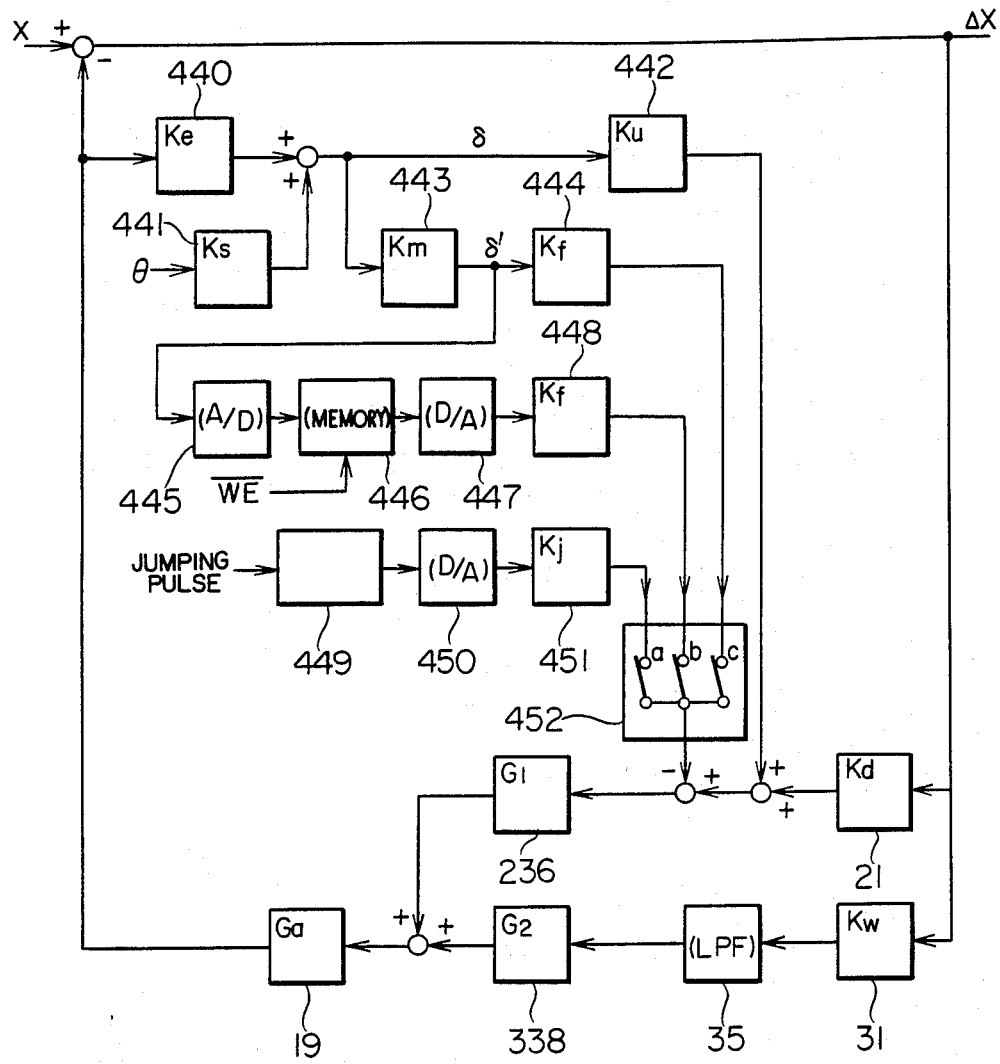
FIG. 15 is a view showing in a block diagram a sixth embodiment of the present invention.

FIG. 15 shows still another embodiment of the present invention in a block diagram. This embodiment differs from the one shown in FIG. 12 in that the optical axis deviation $\delta'$ detected with reference to the mirror surface area is quantized by an A/D converter 445, the resulting data being stored in a memory 446 for one track and read out therefrom immediately after rough access operation to be subsequently restored into the analogue value through a D/A converter 447, while Kf' is integrated by a stored optical axis deviation correction calibrating circuit 448. Further, there are provided a counter 449 for counting the jump pulses during the fine access operation, a D/A converter 450 for converting the content of the counter 441 to an analogue value, and a circuit 451 for multiplying the output value of the D/A converter 450 with a jump offset correcting factor Kj. Additionally, a switch 452 is provided for selecting the open-loop correction on the basis of the output Kf, Kf' or Kj or information resulting from combination of these output. In the course of the normal tracking operation, only the contact c of the selected switch 452 is closed, whereby the circuit configuration is realized which is utterly same as that of the system shown in FIG. 14. During a period elapsing until the latest mirror face data is sampled in the rough access sequence for shifting the tracking actuator itself, the selector switch 452 is set to the state where only the contact b is closed. On the other hand, in the case of the fine access sequence in which successive track jumpings take place, the contacts a and c or alternatively a and b of the selector switch 452 are closed. By changing over the selector switch 452 in dependence on the types of sequences in the manner mentioned above, the open offset correcting loop 40 is maintained in the operating state not only in the steady state but also during the seeking operation, whereby delay in response of the offset suppressing loop inherent to the composite tracking system can be componented for successfully.

The first and second embodiments described hereinbefore are directed to the inter-groove recording/reproducing system (refer to FIGS. 2A and 2D). The intragroove land recording/reproducing system (FIG. 2B and 2C) can be realized by connecting inverter amplifiers, respectively, to the outputs of the differential amplifier 21 of the push-pull loop and the differential amplifier 335 of the wobble loop shown in FIG. 12. Further, by using analogue peak hold circuits in place of the sample and hold circuits 313 and 414 shown in FIG. 12, respectively, there can be realized a composite wobbling type tracking system which has an increased operation margin for variation in gain and can compensate for the delay in response of the offset suppressing loop.

According to the illustrated embodiments of the present invention, the offset ascribable to the tilt of disc or eccentricity in the disc surface or the offset occurring upon high-speed successive jumping, by way of example, can be cancelled by the open correction loop, while the wobble loop is effective for suppressing the residual offset which could not be eliminated by the open correction loop. Thus, there is provided a composite track wobbling type tracking servo system in which the gain of the wobble loop can be made smaller and which is stabilized against variations in the detection sensitivity of the push-pull loop while enjoying excellent response characteristic.

Although the foregoing description has been directed only to the composite control system based on the combination of the push-pull and prewobbling techniques, it should be understood that other various combinations such as combination of the push-pull method and the intermittent tracking method typified by combination of the push-pull method and the intermittent three-spot method.

What is claimed is:

1. A tracking servo system, comprising:
   a recording medium provided with pegrooves having a plurality of discontinued regions;
   an optical system for forming a light spot on said recording medium;
   photoelectric transducer means having at least two light receiving portions;
   first means coupled to said photoelectric transducer means to produce a first track error signal on the basis of a first track deviation signal derived by processing differentially the outputs of said light receiving portions;
   second means coupled to said photoelectric transducer means for detecting intermittently the outputs of said transducer means obtained during a period in which said light spot is positioned on said discontinued region to thereby output a second track error signal on the basis of a second track deviation signal obtained intermittently through said intermittent detection;
   third means coupled to either one of said first or second means for outputting an offset correcting signal on the basis of said first or second track deviation signal;
   composite means directly coupled to said first, second and third means for combining compositely said first track error signal, said second error signal and said offset correcting signal; and
   tracking means coupled to said composite means for controlling the position irradiated by said light spot in accordance with the output of said composite means.

2. A tracking servo system according to claim 1, wherein at least a pair of wobbled track, marks are provided in each of said discontinued regions, said second means detects intermittently said second track deviation signal on the basis of the output produced by said transducer means during a period in which said light spot is positioned on said wobbled track marks, said second track deviation signal being passed through a low pass filter to output said second track error signal.

3. A tracking servo system according to claim 2, wherein said third means is coupled to said second means and outputs said offset correcting signal on the basis of said second track deviation signal detected intermittently during a period in which said light spot is positioned on said wobbled track marks.

4. A tracking servo system according to claim 3, wherein said third means includes means for digitizing said second track deviation signal, means for storing the digitized signal, and means for converting said stored signal to an analogue signal.

5. A tracking servo system according to claim 3, wherein said third means includes calibrating means for multiplying said second track deviation signal with a predetermined constant.

6. A tracking servo system according to claim 3, wherein said composite means includes means for adding together said first track error signal and said second track error signal, and means for adding said offset correcting signal to the error signal resulting from said addition.

7. A tracking servo system according to claim 3, wherein said composite means includes switch means for switching between said second track error signal and said offset correction signal, and means for adding together the signal from said switch means and said first track error signal.

8. A tracking servo system according to claim 1, wherein each of said discontinued regions is provided with at least a mirror surface area of a diameter greater than that of said light spot, said third means being coupled to said first means for outputting said offset correcting signal on the basis of said first track deviation signal obtained during a period in which said light spot is positioned on said mirror surface area.

9. A tracking servo system according to claim 8, wherein said composite means includes means for subtracting said offset correcting signal from said first track error signal, and means for adding said first track error signal and said second track error signal with each other.

10. A tracking servo system according to claim 9, wherein said composite means includes switch means for changing over the subtraction of said offset correcting signal with the addition of said track error signal.

11. A tracking servo system according to claim 1 wherein said composite means includes switching means for switching between said second track error signal and said offset correcting signal for combination with said first track error signal.

12. A tracking servo system according to claim 11, further including means coupled to said second means for comparing said second track deviation signal with a predetermined value to thereby produce a signal for controlling said change-over operation.

13. A tracking servo system according to claim 1, wherein said composite means combines compositely said first track error signal, said second error signal and said offset correcting signal to implement a triple-loop servo system.

14. A tracking servo system according to claim 1, wherein said third means includes means for producing a plurality of offset correcting signals, and selecting means for outputting selectively at least one offset correcting signal from said plurality of offset correcting signals.

15. A tracking servo system, comprising:
   a recording medium provided with pregrooves having a plurality of discontinued regions;
   an optical system for forming a light spot on said recording medium;
   photoelectric transducer means having at least two light receiving portions;
   first means coupled to said photoelectric transducer means to produce a first track error signal on the basis of a first track deviation signal derived by processing differently the outputs of said light receiving portions;
   second means coupled to said photoelectric transducer means for detecting intermittingly the outputs of said transducer means obtained during a period in which said light spot is positioned on said discontinued region to thereby output a second track error signal on the basis of a second track deviation signal obtained intermittingly through said intermittent detection;
   third means coupled to either one of said first or second means for outputting an offset correcting signal on the basis of said first or second track deviation signal;
   composite means coupled to said first, second and third means for combining compositely said first track error signal, said second error signal and said offset correcting signal; and tracking means coupled to said composite means for controlling the position irradiated by said light spot in accordance with the output of said composite means;

wherein each of said discontinued regions is provided with at least a mirror surface area of a diameter greater than that of said light spot, said third means being coupled to said first means for outputting said offset correcting signal on the basis of said first track deviation signal obtained during a period in which said light spot is positioned on said mirror surface area; and wherein said third means include a sample and hold circuit for sampling said first track deviation signal during a period in which said light spot is positioned on said mirror surface area and holding the sampled signal, and a calibration circuit for multiplying the output of said sample and hold circuit with a predetermined factor.

16. An optical disc apparatus for recording and/or reproducing information on an optical disc by means of a light spot, comprising:

an optical disc provided previously with pregrooves having a plurality of discontinued regions in the rotating direction of said disc;

an optical system for forming a light spot on said optical disc;

photoelectric transducer means having at least two light receiving portions for detecting light reflected from said disc;

first means coupled to said transducer means for outputting a first track error signal on the basis of a first track deviated by processing differently the outputs of said light receiving portions;

second means coupled to said transducer means for detecting intermittingly the output of said transducer means produced during a period in which said light spot is positioned on said discontinued region and outputting a second track error signal on the basis of a second track deviation signal obtained intermittingly;

third means coupled to either one of said first or second means for outputting an offset correcting signal on the basis of said first or second track deviation signal;

composite means directly coupled to said first, second and third means for compositely combining said first track error signal, said second error signal and said offset correcting signal; and tracking means coupled to said composite means for controlling the position irradiated by said light spot in accordance with the output of said composite means.

17. An optical disc apparatus according to claim 16, wherein lead-in to the tracking is effected on the basis of said first track error signal, an offset component produced immediately after completion of said lead-in operation being detected, said third means producing an offset correcting signal of reverse polarity to cancel out said detected offset, the tracking being carried out on the basis of both of said first and second track error signals when said detected offset is decreased below a predetermined value, whereupon application of said offset correcting signal is cleared.

18. A optical disc apparatus according to claim 16, wherein a triple loop track servo system is realized by making use of all of said first and second track error signal and said offset correcting signal.

19. An optical disc apparatus according to claim 18, wherein said offset correcting signal for one turn of said track is read out during operation in which all or a part of the optical system including said tracking means is moved transversely of the track for searching the desired track, said signal being applied through an open loop.

20. An optical disc according to claim 18, comprising means for jumping said light spot track by track, and wherein during an operation for jumping said light spot track by track, the offset correcting signal is increased or decreased progressively for each jumping and applied through an open loop.

* * * * *